United States Patent [19]

Krause

[11] 4,353,382

[45] Oct. 12, 1982

[54] DEVICE FOR REMOVING THE LACQUER FROM WAVEGUIDES

[75] Inventor: Dieter Krause, Munich, Fed. Rep. of Germany

[73] Assignee: Siemens Aktiengesellschaft, Berlin & Munich, Fed. Rep. of Germany

[21] Appl. No.: 240,882

[22] Filed: Mar. 5, 1981

[30] Foreign Application Priority Data

Mar. 19, 1980 [DE] Fed. Rep. of Germany ........ 3010594

[51] Int. Cl.³ .............................................. B08B 3/08
[52] U.S. Cl. ................................ 134/113; 134/56 R; 134/135; 134/155
[58] Field of Search .................... 134/56 R, 113, 135, 134/137, 149, 154–156, 160, 164

[56] References Cited

U.S. PATENT DOCUMENTS

| | | | |
|---|---|---|---|
| 1,416,811 | 5/1922 | Frayer et al. | 134/56 R |
| 2,626,620 | 1/1953 | Smith | 134/113 X |
| 2,644,440 | 7/1953 | Bailey, Sr. | 134/113 X |
| 3,459,202 | 8/1969 | Roberson | 134/135 X |
| 3,894,551 | 7/1975 | Stohlman | 134/135 |

FOREIGN PATENT DOCUMENTS 674759  7/1952  United Kingdom ................ 134/137

Primary Examiner—Robert L. Bleutge
Attorney, Agent, or Firm—Hill, Van Santen, Steadman, Chiara & Simpson

[57] ABSTRACT

A device for partially removing lacquer from a light waveguide characterized by a housing containing a tub or recess for receiving a bath of a lacquer removing substance and a pivotable arm mounted on the housing and movable to a position for holding a portion of the light waveguide immersed in a bath in the tub. The tub or recess has the desired dimensions corresponding to the desired length of the segment to be delacquered and the housing may include a timing device which will indicate the end of the de-lacquering operation. The device preferably includes a reservoir for the substance which has a valve to emit a given amount into the recess and a catch tank for receiving used lacquer removing material.

11 Claims, 4 Drawing Figures

DEVICE FOR REMOVING THE LACQUER FROM WAVEGUIDES

BACKGROUND OF THE INVENTION

The present invention is directed to a device for partially de-lacquering or removing lacquer from a segment or portion of a waveguide particularly the ends of waveguides such as optical fibers which are clamped in a holding device.

The partial de-lacquering of light waveguides has been previously carried out by hand wherein the individual light waveguides were treated with a lacquer remover. The lacquer remover is thus supplied to the light waveguides with a brush, rag or a pipette. Also it is known to insert the ends of the light waveguides such as the fiber into a vessel containing a lacquer remover.

Problems with known methods are that the precise length as well as the position of the segment of the light waveguide which is being de-lacquered is not precisely reproduceable. Thus, the length of the portion being stripped of the lacquer may vary and the position of this portion in the light waveguide such as an optical fiber may be imprecisely located.

SUMMARY OF THE INVENTION

The present invention is directed to providing a device, which in a simple manner will enable partially de-lacquering one or more light waveguides simultaneously with a precision in both the length of the portion having the lacquer removed as well as the position of the portion so that both the length and the position can be precisely reproduced.

To accomplish these goals, the device for removing lacquer from a segment of at least one light waveguide and in particular the ends of light waveguides which are clamped in a holding device includes a housing containing a tub or recess for receiving a bath of a lacquer removing substance, said tub or recess has a dimension corresponding to the desired length of the segment to be de-lacquered, and a pivotable arm mounted on the housing and movable to a position for holding a portion of the light waveguide, which was disposed above the recess, immersed in the bath in the tub or recess.

Generally, the ends of the light waveguides are clamped into a pivotable holding device which enables treating several light waveguides simultaneously whether the operation is for cutting the waveguides to a precise length or for splicing. It is particularly advantageous when the light waveguides are already clamped in these generally pivoting holding devices before the de-lacquering operation and before the required cutting. In this case, it is advantageous that the light waveguide ends are positioned over a recess or tub filled with the lacquer removing agent and that by means of pivoting the holding device of the splicing and/or cutting device and following this by utilizing the pivotable arm of the lacquer removing device which is often pivoted in the opposite direction. The desired length of each of the fibers or waveguides is inserted in the recess or tub for immersion in the bath of material. It is advantageous that the immersion time is controlled with the help of a time switch, which, after the expiration of a set time, will create a signal or in the case of an automated device can bring about an upward pivoting of the lever to allow the waveguides to be removed from the bath of lacquer removing material.

The device of the present invention also preferably includes a storage container for the lacquer remover substance which is in communication with the tub or recess through a control valve which can be actuated by a cam mounted on a shaft of a spring motor which is part of the time switch. Thus, during the beginning of the operation, the time switch can be set to the desired length of time and during this setting, the valve will be actuated to provide a given amount of fresh lacquer removing substance in the recess.

The device also preferably includes a collecting tank for collecting the used lacquer removing substances. The recess is provided with a weir on a wall which is in communication with a channel extending to the collecting tank so that the substance flowing out of the recess is collected.

DESCRIPTION OF THE PREFERRED EMBODIMENTS

Figure 1:
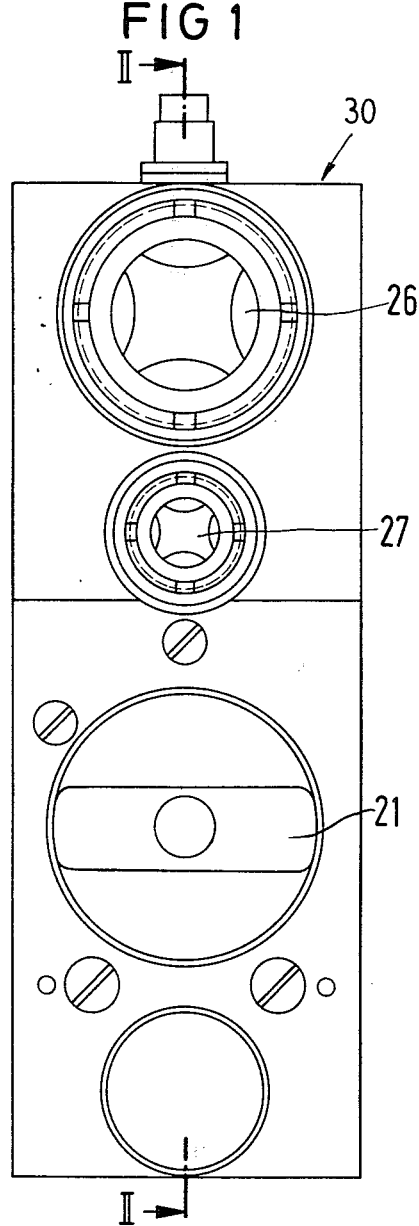
FIG. 1 is an end view of the device in accordance with the present invention.

The principles of the present invention are particularly useful in a device generally indicated at 30 in the Figures for removing lacquer from at least one waveguide such as the waveguide 1 which is illustrated as an optical fiber type waveguide.

In particular, the device 30 is useful for removing lacquer from a portion of one or more waveguides which are held in a clamping device 2. As illustrated, the clamping device 2 is mounted on an arm 2', which pivoted around a fulcrum point 3 through an angle $\alpha$ below a horizontal line or position 31. The clamping device 2, which is pivoted on the fulcrum 3, can belong to a splicing device which is used for the production of light waveguide connections. An example of the splicing device is disclosed in the earlier U.S. Patent Application Ser. No. 217,163, filed Dec. 16, 1980, which application is assigned to the same assignee as the present application and was based on German Patent Application No. P 29 51 483. The clamping device 2 can be constructed so that it can receive one or more individual waveguides such as optical fibers. For example, it can be constructed to receive six or more individual light waveguides. While the clamping device 2 was disclosed as belonging to a splicing device, it can also be provided as an accessory device for the device 30.

Figure 2:
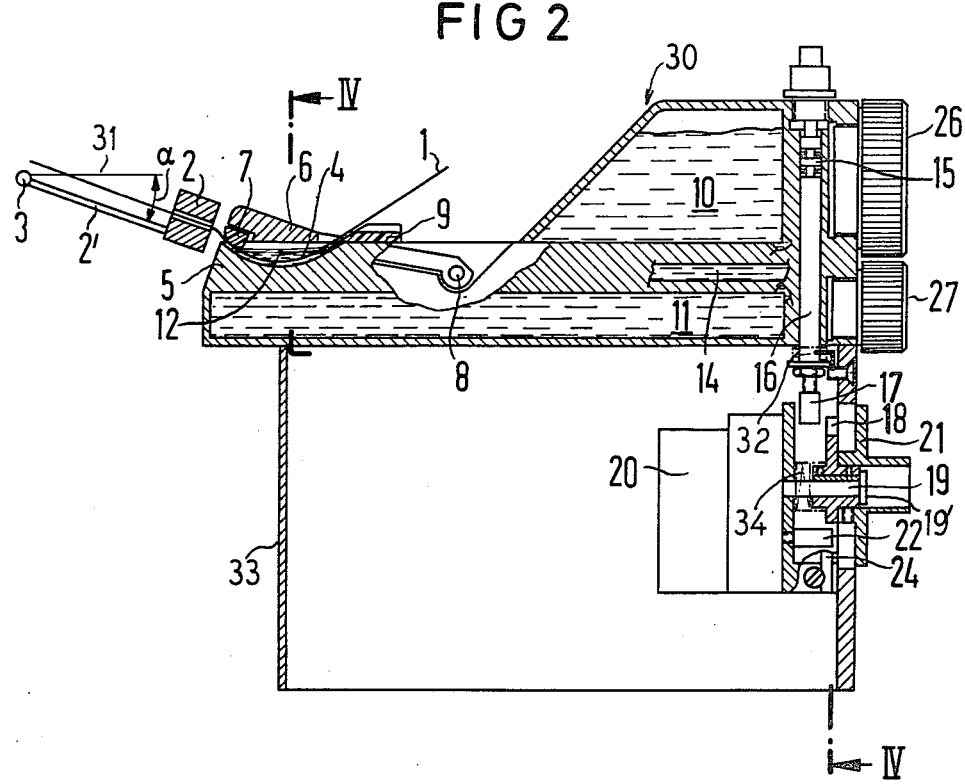
FIG. 2 is a cross-sectional view taken along the lines II—II of FIG. 1.
Figure 3:
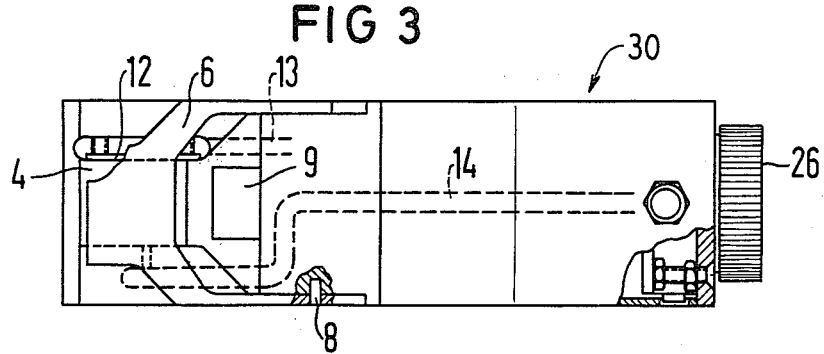
FIG. 3 is a plan view of the device of FIG. 1 with portions broken away for purposes of illustration.

The device 30 has an upper housing part 5 which has an upper surface is provided with a recess or tub 4 which is best illustrated in FIG. 2 and receives a quantity of lacquer dissolving agents or lacquer remover. As illustrated, the tub 4 is formed adjacent one end of the housing 5 so that a light waveguide 1 received in the clamping device 2 can be pivoted to lie over the recess or tub. By utilizing a pivotable arm or lever 6, the waveguide 1 can be deflected and urged into a bath 31 in the tub so that a selected portion will be immersed in the bath of liquid. The pivotable lever arm 6 has a U-shape and carries a pressure piece 7 of teflon so that the light waveguides are not damaged when engaged thereby. The pivotable arm or lever 6 is mounted on the housing part 5 by means of pins or pegs 8 (see FIG. 3). In order to adjust the length of the segment or portion of the light waveguide which will be immersed in the bath in the recess 4, an adjustable rest 9 of teflon is adjustably mounted on one end of the recess or tub 4 opposite the end adjacent the clamping device 2.

Figure 4:
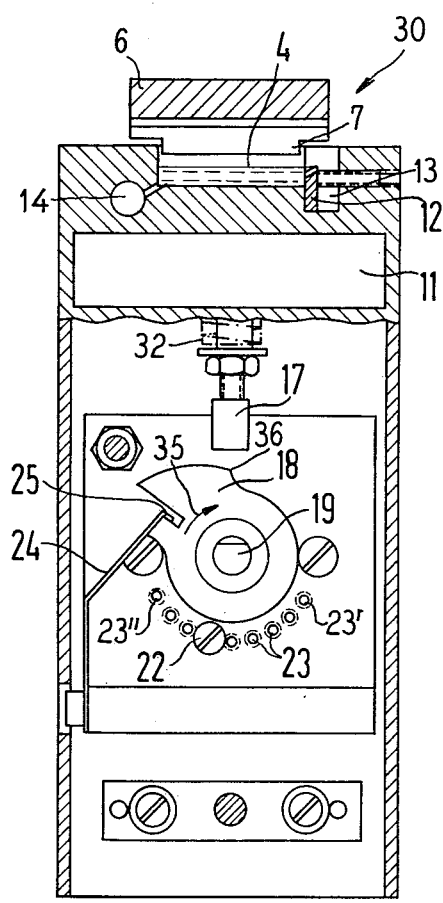
FIG. 4 is a cross-sectional view taken along the lines IV—IV of FIG. 2.

The upper housing part 5 includes a storage container or reservoir 10 for the lacquer removing material or substance and also includes a collecting tank 11. The tub 4 adjacent one surface or wall is provided with a weir 12 as best illustrated in FIG. 4. This weir 4 will control the maximum depth of the fluid in the bath of the tub 4 and is in communication with a channel 13 that extends to the collecting tank 11. Thus the lacquer remover, which flows over the weir 12 will be conducted by the channel 13 to the collecting tank 11 which has an inspection glass 27.

In order to supply fresh lacquer removing material to the bath in the tub 4, the storage container 10, which has an inspection window 26, is connected via a channel 14 which has a valve member 15, that is mounted on a spring biased plunger 16 and controls the flow in the channel 14. The plunger 16 on a lower end portion 17 which will engage a cam plate 18 which rotates on a shaft 19 of a spring motor 20. Thus, when the cam 18 (FIG. 4) engages the lower end portion 17, it lifts the plunger 16 against the force of the spring 32 to actuate the valve 15 to allow the fluid in the storage container 10 to be vented to the recess or tub 4 which is located in the housing at a lower position.

As best illustrated in FIG. 2, the spring motor 12 is mounted in a lower housing part 33 of the device 30. The spring motor 20 has the shaft 19 on which the cam member 18 as well as a handle or knob 21 are mounted. It should be noted that both the cam 18 and the handle or knob 21 are axially displaced on the shaft 19 and are urged towards the enlarged end 19' of the shaft by a spring 34. When urged against the enlarged portion 19', the cam 18 is axially displaced from a position for engaging the end 17 of the plunger 16. As best illustrated in FIG. 4, the cam 18 when in a rest position has a notch 25 receiving the end of a spring detent 24. The cam 18 has a stop surface 36 which is opposite the notch 25 and is adapted to engage a screw bolt 22 which may be threaded into any one of a series of holes 23. By selecting the desired hole, the annular amount of rotation in the clockwise direction indicated by the arrow 35 can be limited.

In operation, the handle 21 with the cam 18 is pushed inward against the spring 34 to disengage the spring detent 24 and to align the cam 18 with the bottom or end 17. As the handle and the cam are turned in a clockwise direction indicated by arrow 35, the cam will engage the end 17 to lift the plunger 16 to open the valve 15 for a short duration. With continued rotation in the direction 35, the stop surface 36 engages the screw 22. The rotation of the handle and the cam in the clockwise direction will wind a spring of the time switch or clock which utilizes the spring motor 20. Upon release of the handle, the spring 34 will urge the handle and cam to the outermost axial position illustrated in FIG. 2 and the motor 20 will unwind for a given length of time depending upon the total annular rotation in a clockwise direction 35. Thus, by placing the screw bolt 22 in an aperture such as 23' the length of time will be decreased and if the screw bolt is moved to the aperture 23", the length of predetermined time is increased. In a manner similar to an eggtimer and other timing devices utilizing a spring motor, when the motor returns the cam to the returned position, the cam 18 is engaged by the detent 24 and a signal such as a gong or bell will be sounded.

In operating the device 30, one or more waveguides 1 can be located horizontally in the clamping device 2. To remove the lacquer from a given portion of each of the waveguides, the clamping device is pivoted downward by the angle α so that the ends of the waveguides are positioned over the tub 4 which is filled with the lacquer remover. Next, the lever arm 6 is pivoted in a counterclockwise direction so that the pressure piece 7 engages the waveguides and urges them to be immersed into the bath of lacquer remover in the tub or recess 4. It should be noted, that due to the position of the weir 12, the plate or pressure member 7 does not enter into the pool or bath of lacquer remover. At the same time as moving the lever 6 to the position to urge the waveguides 1 into the bath of lacquer remover, the knob 21 was moved inward against the spring 34 and turned the maximum amount in the direction of the arrow 35 to start or wind the spring motor of the time clock. As soon as the spring motor has unwound, a chime will sound indicating the end of a predetermined amount of time and the de-lacquering process. The lever 6 is then pivoted upward to release the waveguide 1 and then the clamping device 2 is again pivoted upward.

Although various minor modifications may be suggested by those versed in the art, it should be understood that I wish to embody within the scope of the patent granted hereon, all such modifications as reasonably and properly come within the scope of my contribution to the art.

I claim:

1. A device for removing lacquer from a portion of at least one light waveguide and in particular the end of a light waveguide which is clamped in a holding device, said device for removing lacquer comprising a housing containing a tub for receiving a bath of a lacquer removing substance, said tub having a dimension corresponding to the desired length of the segment to be de-lacquered, and a pivotable arm being mounted in said housing and being movable to a position for holding a portion of the light waveguide, which was disposed above the bath in said tub.

2. A device according to claim 1, which includes a time switch providing a signal after an expiration of a set time so that the time of immersing the waveguide in the bath can be controlled.

3. A device according to claim 2, wherein the time switch is a spring motor which is manually wound.

4. A device according to claim 3, wherein said housing includes a storage container for storing a supply of the lacquer remover, said storage container being disposed in said housing at a point above the liquid surface level of said bath, said housing having a conduit having a valve actuated by a spring biased plunger and extending from said container to said tub, and wherein said spring motor has a shaft supporting a cam plate, said cam plate being movable on said shaft to be aligned to actuate said spring biased plunger of the valve as the cam plate is rotated between two positions.

5. A device according to claim 4, wherein the housing includes a collecting tank and said tub on one wall surface having a weir connecting the tub to a channel extending to said collecting tank.

6. A device according to claim 1, wherein the holding device in which the ends of the waveguides are clamped is a pivotable holding device movable to a position for holding the waveguide end inclined over the surface of the bath in said tub, and said lever being pivoted in the opposite direction to engage the end of the waveguide to immerse it in said bath.

7. A device according to claim 6, which includes a time switch for creating a signal to indicate the passing of a set amount of time so that the immersion time in the bath can be controlled by removing the waveguide from the bath when the signal is received.

8. A device according to claim 1, wherein the housing includes a storage container for the lacquer remover, a conduit including a valve actuated by a spring loaded plunger connecting the storage container to the tub, and means for actuating the spring loaded plunger to briefly discharge lacquer removing material from the storage container into the tub.

9. A device according to claim 8, wherein the housing includes a collecting tank, the tub has a weir on one wall, a channel extending from said weir to the collecting tank so that fluid passing over the weir is received by the collecting tank.

10. A device according to claim 1, wherein the tub on one wall has a weir, said housing containing a collecting tank and a channel extending from said weir to the collecting tank to convey fluid passing over the weir to the collecting tank.

11. A device according to claim 1, wherein a rest member is adjustably mounted on said housing adjacent one end of the tub so that dimensions of the tub and the desired length of the segment can be adjusted.

* * * * *